US006774170B2

(12) United States Patent
Webster

(10) Patent No.: US 6,774,170 B2
(45) Date of Patent: Aug. 10, 2004

(54) POLYOLEFIN ARTICLES WITH LONG-TERM ELEVATED TEMPERATURE STABILITY

(75) Inventor: Joseph R. Webster, Charlotte, NC (US)

(73) Assignee: Clariant Finance (BVI) Limited, Tortola (VG)

( * ) Notice: Subject to any disclaimer, the term of this patent is extended or adjusted under 35 U.S.C. 154(b) by 194 days.

(21) Appl. No.: 10/015,189

(22) Filed: Dec. 7, 2001

(65) Prior Publication Data

US 2002/0156165 A1 Oct. 24, 2002

Related U.S. Application Data

(63) Continuation-in-part of application No. 09/685,314, filed on Oct. 10, 2000.

(51) Int. Cl.$^7$ ............................. C08K 3/30; C08K 5/34; C08K 5/15; C08K 5/53; C08K 5/09

(52) U.S. Cl. ...................... 524/418; 524/96; 524/100; 524/101; 524/108; 524/131; 524/146; 524/153; 199/232; 199/248; 199/291; 199/336; 199/343; 199/349; 199/359; 252/400.23; 252/401; 252/402; 252/403

(58) Field of Search ..................... 524/418, 96, 100, 524/101, 108, 131, 146, 153, 199, 232, 248, 291, 336, 343, 349, 359; 252/400.23, 401, 402, 403

(56) References Cited

U.S. PATENT DOCUMENTS

| | | |
|---|---|---|
| 3,344,113 A | 9/1967 | Alheim et al. |
| 3,511,802 A | 5/1970 | Newland et al. |
| 3,644,482 A | 2/1972 | Dexter et al. |
| 3,681,417 A | 8/1972 | Simons |
| 3,684,765 A | 8/1972 | Matsui et al. |
| 3,894,838 A | 7/1975 | von der Eltz et al. |
| 3,944,594 A | 3/1976 | Kleiner et al. |
| 4,012,192 A | 3/1977 | Doerr |
| 4,251,282 A | 2/1981 | Vahlensieck et al. |
| 4,251,650 A | 2/1981 | Mietzsch et al. |
| 4,343,653 A | 8/1982 | Beach et al. |
| 4,366,271 A | 12/1982 | Riegler |
| 4,367,307 A | 1/1983 | Hirai et al. |
| 4,925,889 A | 5/1990 | Capolupo et al. |
| 4,976,889 A | 12/1990 | Aumueller et al. |
| 4,985,480 A | 1/1991 | Fukui et al. |
| 4,992,078 A | 2/1991 | Meszaros |
| 5,086,173 A | 2/1992 | Tritschler et al. |
| 5,098,945 A | 3/1992 | Pitteloud et al. |
| 5,199,957 A | 4/1993 | Pascoe |
| 5,240,466 A | 8/1993 | Bauer et al. |
| 5,300,148 A | 4/1994 | Domingo et al. |
| 5,326,622 A | 7/1994 | Yamane et al. |
| 5,376,290 A | 12/1994 | Meier et al. |
| 5,383,961 A | 1/1995 | Bauer et al. |
| 5,470,356 A | 11/1995 | Meszaros |
| 5,571,899 A | 11/1996 | Kaul et al. |
| 5,618,909 A | 4/1997 | Lofquist et al. |
| 5,705,545 A | 1/1998 | Avar et al. |
| 5,851,238 A | 12/1998 | Gadoury et al. |
| 5,874,493 A | 2/1999 | Webster |
| 5,932,640 A | 8/1999 | Kaul et al. |
| 5,965,261 A | 10/1999 | Webster |
| 5,969,014 A | 10/1999 | Webster et al. |
| 6,063,843 A | 5/2000 | Sidqi et al. |
| 6,126,736 A | 10/2000 | Stoll et al. |
| 6,153,676 A | 11/2000 | Avar et al. |
| 6,197,274 B1 | 3/2001 | Mahmud et al. |
| 6,201,047 B1 | 3/2001 | Avar et al. |
| 6,218,452 B1 | 4/2001 | Kaul et al. |
| 6,262,153 B1 | 7/2001 | Webster et al. |

FOREIGN PATENT DOCUMENTS

| | | |
|---|---|---|
| CA | 843985 | 6/1970 |
| DE | 3233953 A1 | 3/1984 |
| DE | 4012449 A1 | 10/1991 |
| EP | 0325172 B1 | 7/1989 |
| EP | 0417017 B1 | 3/1991 |
| EP | 0675160 A2 | 10/1995 |
| GB | 419445 | 4/1933 |
| GB | 820207 | 10/1959 |
| GB | 2292559 | 2/1996 |
| JP | 3-207733 | 9/1991 |
| WO | 95/28443 | 10/1995 |
| WO | 97/05189 | 2/1997 |
| WO | 97/43335 | 11/1997 |

OTHER PUBLICATIONS

U.S. patent application Ser. No. 08/518,625, filed Aug. 23, 1995, Sanahuja.
U.S. patent application Ser. No. 09/141,893, filed Aug. 28, 1998, Webster et al.
English Abstract of DE 4012449 Oct. 24, 1991.
English Abstract of DE 3233953; Mar. 15, 1984.
English Abstract of JP 03–207733; Sep. 11, 1991.
English Abstract of JP 6010276A; Jan, 18, 1994.
English Abstract of JP 60–042441; Mar. 06, 1985.
Hawkins et al., "Synergistic Antioxidant Combinations. Mechanism of Stabilization with Organo–Sulfur Compounds" pp. 3499–3509, from "Journal of Polymer Science: Part A", vol. 1; 1963.
Stengrevics et al., "Stabilization of Filled Polyolefins"; pp. 35–39, from "Plastics Compounding" Jul. 1987.

(List continued on next page.)

Primary Examiner—Kriellion A. Sanders
(74) Attorney, Agent, or Firm—Anthony A. Bisolca

(57) ABSTRACT

A heat stabilizing composition for polyolefins comprises an oxidized, non-cationized, non-silylated sulfur black pigment, a hindered phenolic antioxidant a sulfur-containing secondary stabilizer, each in stabilizing amount, and a hindered amine. The heat stabilizing composition yields polyolefin compounds and articles having improved long term heat aging stability. Preferably, the sulfur black pigment is treated by washing, to thereby reduce the concentration of soluble sodium salts.

10 Claims, 6 Drawing Sheets

OTHER PUBLICATIONS

Hawkins et al.; "Stabilization of Plastic Insulating Material For Wire and Cable", pp. 82–89 from "The Plastics Institute", vol. 29 No. 81, Jun. 1961.

Hawkins et al., "New Thermal Antioxidants for Polyethylene Containing Carbon Black", pp. 43–49 from "Journal of Applied Polymer Science" vol. I, Issue No. 1, 1959.

Crompton, "The Effect of Carbon Black on Thermal Antioxidants for Polyethylene" pp. 558–560 from "Journal of Applied Polymer Science", vol. VI, Issue No. 23, 1962.

Hawkins, "The Effect of Carbon Black on Thermal Antioxidants for Polyethylene", pp. 37–42 from "Journal of Applied Polymer Science", vol. 1, Issue No. 1; 1959.

Whitney, "The Modifying Characteristics of Special Carbon Blacks With Emphasis On Ultra–Violet Light Stabilization" from 1998 Society of Plastics Engineers Regional Conference; Oct. 2, 1988.

Williams et al., "Effect of the Chemical and Physical Properties of Carbon Black on its Performance in Polyethylene" pp. 861–886, for "Journal of Applied Polymer Science" vol. 9; 1965.

Kovacs, et al., "The Effect of the Chemical and Physical Properties of Carbon Black on the Thermal and Photooxidation of Polyethylene", pp. 171–180, from "Journal of Polymer Science", Symposium No. 57; 1976.

Hawkins, "Stabilization Update–Carbon Black–The Complete Stabilizer for Polyethylene", p. 32 from "Polymer News" vol. 4; 1977.

Turley et al., "Using Carbon Black to Protect Linear Low Density Polyethylene from Ultra–Violet Light Degradation", pp. 53–59 from "Journal of Advanced Materials"; Apr. 1994.

Chemical Abstract 72:11860t; 1970.

Chemical Abstract 69:10147s; 1968.

Howard, "Autoxidation and Antioxidants. Basic Principles and New Developments", pp. 976–990; from "Rubber Chemistry and Technology"; May 7, 1974.

Uzelmeier, "How Heat and Light Affect Pigmented Polypropylene", pp. 69–74, from "SPE Journal", vol. 26; May 1970.

Uzelmeier, "The Effect of Pigments on the Heat and Light Stability Of Polypropylene"; pp. 29–33; 1969.

"A Total System Approach—Colorants and Additive Modifiers", from "1998 Society of Plastics Engineers Regional Conference"; 1988.

"Epoxide Resin Tools" pp. 448,449, from "British Plastics", Oct. 1957.

Ambrose "Pigments in Polymer Materials", p. 446, from "British Plastics", Oct. 1957.

Serizawa et al., "Effects of Oxidation of Carbon Black Surface on the Properties of Carbon Black–Natural Rubber Systems", pp. 201–206, from "Polymer Journal", vol. 15, No. 3, 1983.

Hawkins et al., "Carbon Black as a Catalyst in the Oxidation of Antioxidants" pp. S106, S107, from "Journal of Polymer Science", vol. 62, Issue 174; 1962.

Hawkins et al., "Synergistic Antioxidant Combinations. Carbon Black Substitutes" pp. 3489–3497 from "Journal of Polymer Science: Part A", vol. 1; 1963.

Walker et al., "Carbon–Black Survives 20 Years of Weathering in Canada", pp. 68–72, from Modern Plastics; May 1983.

Latocha et al., "Temperature Effect on the Cooperative Action of Antioxidants", pp. 189–192, from "Polymer Degradation and Stability"; vol. 7; 1984.

Scott, "Atmospheric Oxidation and Antioxidants", pp. 119–125, Elsevier Publishing Company; 1965.

Matreyek et al., Effect of Carbon Black, Antioxidants, and Ultraviolet Absorbers on the Photooxidation of Polyethylene, pp. 606–610, 1974.

Drogin, "The Use of Carbon Black in Plastics", pp. 248–252, from "SPE Journal", Mar. 1965.

Sample #1 Surface at 40X After 48 Hours at 150C

Sample 3 Surface Photo 40X
After 49 hours at 150C

Sample 4 Corner Shot 40X
48 Hours at 150C

Sample 4 Surface Photo 40X After 48 Hrs./150C

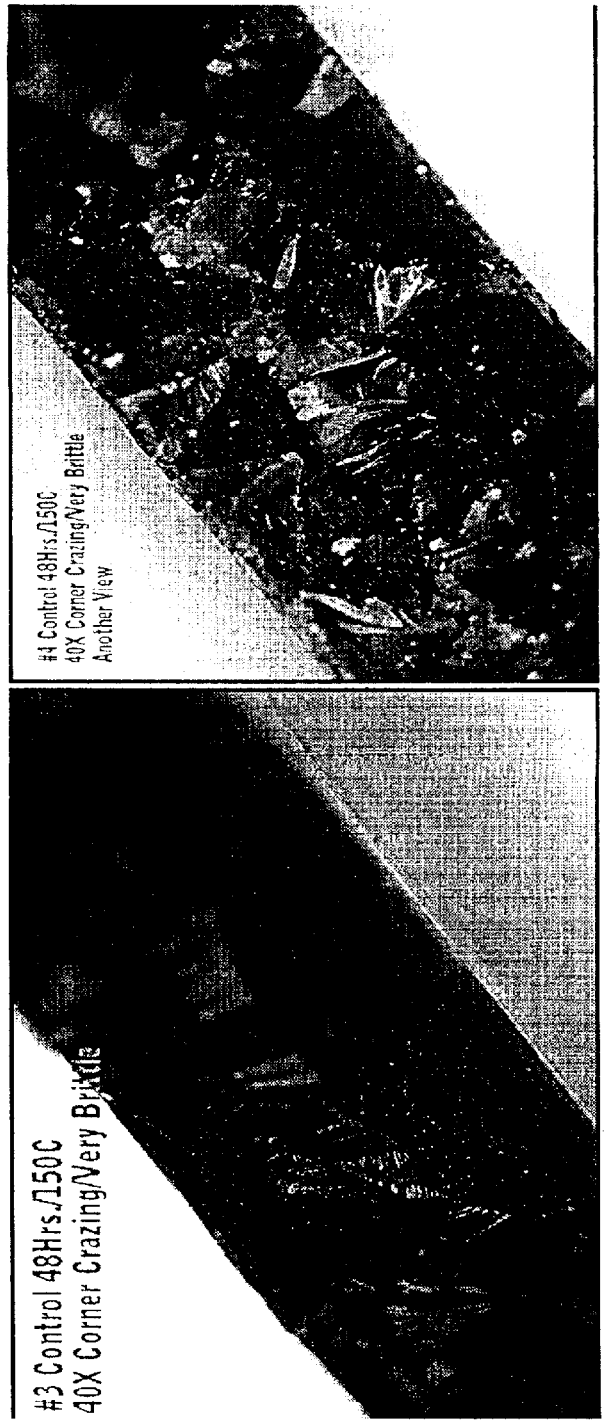
FIG. 6 Sample 3 versus 4 Corner View After 48 Hrs./150C

POLYOLEFIN ARTICLES WITH LONG-TERM ELEVATED TEMPERATURE STABILITY

CROSS REFERENCE TO RELATED APPLICATION

This application is a continuation-in-part of U.S. application Ser. No. 09/685,314, filed Oct. 10, 2000, the disclosure of which is hereby incorporated herein by reference.

FIELD OF THE INVENTION

The invention pertains to the thermo-oxidative stabilization of black pigmented polyolefins, e.g. polyethylene and polypropylene.

BACKGROUND OF THE INVENTION

Compounded polyolefin resins, including polyethylene and polypropylene are increasingly sought for articles which can withstand long term high temperature service, such as automotive under-the-hood parts. The physical, chemical and electrical properties of polyolefin require the use conventionally of carbon black which can improve their stability against light or for coloring, but have a known deleterious effect on long term heat aging performance. Also, other inorganic fillers are sometimes incorporated therein to improve the mechanical properties of polyolefins. On the other hand, polyolefin resins are highly susceptible to thermal oxidative deterioration, and therefore in the past methods phenolic antioxidants and sulfur antioxidants have been used in combination for their synergism. Nevertheless, particularly polyolefin resin compositions containing carbon black with these stabilizers still have a disadvantage of less than desired stability against long term thermo-oxidative stability, and thus their improvement is sought.

The shortcoming in long term thermo-oxidative stability of polyolefins containing carbon black and/or inorganic fillers is reported to be due in large part to deactivation of stabilizers by carbon black and inorganic fillers. Adsorption of stabilizers onto the surface of carbon black particles, and absorption into the interstices of the carbon black particles has been previously shown.

In order to improve the stability of polyolefin resins containing carbon black against long term termo-oxidative stability, some proposals have been made, including a method in which a metal deactivator is incorporated therein (Japanese Patent Kokai No. 207733/91), a method in which a piperidine compound is incorporated therein (Japanese Patent Kokai No. 42441/85 and Plastics Compounding, 1987, July/August, pp. 35, 38, 39), and the incorporation of epoxy resins which provide an impervious surface layer on carbon black.

U.S. Pat. No. 5,214,084 discloses an inorganic filled polypropylene stabilized by incorporating therein the following components:

a hindered phenolic compound having a molecular weight of not less than 500,
a high-molecular hindered piperidine compound,
a low-molecular hindered piperidine compound,
a benzoate compound such as 2,4-di-t-butylphenyl 3,5-di-t-butyl-4-hydroxybenzoate,
a phosphorous compound, and
an amide compound such as ethylene-bis stearylamide.

Furthermore, a method is proposed in U.S. Pat. No. 4,985,480 wherein an amide compound is added to polyolefin resins which contain an inorganic filler such as talc, to improve their stability against thermal oxidation.

U.S. Pat. No. 4,925,889 discloses a carbon black filled polyolefin, a stabilizing amount of a N-phenyl-N'-(p-toluenesulfonyl)-p-phenylenediamine first stabilizer and a second stabilizer component of at least one amine antioxidant selected from the group consisting of a para-substituted, aralkyl-substituted diphenylamine; a para-phenylenediamine and a polymerized dihydroquinoline incorporated into said polyolefin.

A number of substituted phenol compounds, e.g. trialkylphenols, for example 2,6-di-tert-butyl-4-methylphenol and 2,4-dimethyl-6-(1-methylpentadecyl) phenol (U.S. Pat. No. 5,098,945), and their use for stabilizing organic materials are known, and the stabilizing action of sterically hindered phenyls is also described, inter alia, in U.S. Pat. No. 3,944,594, U.S. Pat. No. 3,644,482, U.S. Pat. No. 5,086,173, U.S. Pat. No. 3,644,482, CA 843 985, U.S. Pat. No. 3,681,417.

In general, substituted phenyl compounds that exhibit antioxidant properties for thermoplastics in general contain a phenol group which is substituted by 1 to 3 radicals such as o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 2-methyl-4-tert-butylphenyl, 2-ethylphenyl, 2,6-diethylphenyl, 2,6-diethyl-4-methylphenyl, 2,6-diisopropylphenyl, 4-tert-butylphenyl, p-nonylphenyl, o-, m- or p-chlorophenyl, 2,3-dichlorophenyl, 2,4-dichlorophenyl, 2,5-dichlorophenyl, 2,6-dichlorophenyl, 3,4-dichlorophenyl, 2,4,5-trichlorophenyl, 2,4,6-trichlorophenyl, o-, m- or p-hydroxyphenyl, o-, m- or p-methoxyphenyl, o- or p-ethoxyphenyl, 2,4-dimethoxyphenyl, 2,5-dimethoxyphenyl, 2,5-diethoxyphenyl, o-, m- or p-methoxycarbonyl, 2-chloro-6-methylphenyl, 3-chloro-2-methylphenyl, 3-chloro-4-methylphenyl, 4-chloro-2-methylphenyl, 5-chloro-2-methylphenyl, 2,6-dichloro-3-methylphenyl, 2-hydroxy-4-methylphenyl, 3-hydroxy-4-methylphenyl, 2-methoxy-5-methylphenyl, 4-methoxy-2-methylphenyl, 3-chloro-4-methoxyphenyl, 3-chloro-6-methoxyphenyl, 3-chloro-4,6-dimethoxyphenyl and 4-chloro-2,5-dimethoxyphenyl groups.

U.S. Pat. No. 5,376,290 discloses substituted bis-(mercaptomethyl)-phenols as stabilizers, for example: 2,6-bis-(2'-hydroxyethylthiomethyl)-4-methylphenol, 2,6-bis-(2',3'-dihydroxypropylthiomethyl)-4-methylphenol, 2,6-bis-(2'-methylaminocarbonylethylthiomethyl)-4-phenylphenol, 2,6-bis-(N,N-diethylaminocarbonyl-ethylthiomethyl)-4-allyl-phenol, 2,6-bis-(n-octylthiomethyl)-4-methylphenol, 2,6-bis-(t-octylthiomethyl)-4-t-butyl-phenol.sup.1, 2,6-bis-(t-dodecylthiomethyl-4-t-octyl-phenol.sup.2, 2,6-bis-(benzylthiomethyl)-6-methylphenol, 2,6-bis-(phenylthiomethyl)-4-t-butyl-phenol, 2,6-bis-(2'-ethylhexyloxycarbonylmethyl-thiomethyl)-4-cyclohexyl-phenol, 2,6-bis-(n-octadecyloxycarbonylmethyl-thiomethyl)-4-propargyl-phenol, 2,6-bis-[2'-(2"-ethylhexyloxycarbonyl)-ethylthiomethyl]-4-t-butylphenol, 2,2-bis-[4',4"-dihydroxy-3',3",5',5"-tetrakis-(octylthiomethyl)-phenol]-pr opane, 2,2-bis-]4',4"-dihydroxy-3',3",5',5"-tetrakis-(dodecylthiomethyl)-phenyl]-methane and bis-[4',4"-dihydroxy-3',3",5',5"-tetrakis-(2-ethylhexyloxycarbonylmethylth iomethyl)-phenyl]thioether.

Other known primary antioxidant include tetrakis [methylene-3-(3',5'-di-tert-butyl-4'-hydroxyphenyl)-propionate]methane, sold under the IRGANOX tradename.

In "Atmospheric Oxidation and Antioxidants"; Elsevier Publishing Company (1965), pages 120–125, the author describes the connection between stabilizing action and substitution at the phenol for mineral oils.

U.S. Pat. No. 3,344,113 discloses the use of a mixed esters of thiopropionic acid, e.g., dilauryl, distearyl, and lauryl stearyl thiodipropionates as an improved system relative to the individual stabilizers in polyolefins.

U.S. Pat. No. 3,511,802 discloses the stabilization of polypropylene resins with alkyl-substituted phenols. The preparation as well as the spectra of secondary alkylphenols are given in Chemical Abstracts 69:10147s and 72:11860t.

"Rubber Chemistry and Technology" 47 (1974), No. 4, pages 988 and 989, describes the mode of action of antioxidants.

Elemental sulfur compounds and diaryl disulfides are reported as effective hydroperoxide decomposers by generating sulfur dioxide. Synergistic improvement in combinations with alkylated phenol antioxidant is also reported. Hawkins and Sutter, J. of Polymer Sci. 1, pp. 3499–3509 (1963).

C. Uzelmeier, of Shell Chemical, has reported the mechanism by which pigments can degrade the heat resistance of polypropylene. Interaction between carbon black and stabilizers by way of absorption and reaction with the carbon black particle surface are well documented. W/L. Hawkins, et al, J. Appl. Polym. Sci., 1,37 (1959). Carbon black alone is seen to extend the oxygen induction period of polypropylene at 150° C. at 1 atmosphere oxygen. Carbon black accelerates autoxidation from heat by 56% at levels of 0.1 phr relative to unpigmented, heat-stabilized resin. None of the pigments reported improves the oven heat-aging of polypropylene.

GB 820,207 discloses the use of water soluble disperse dyes extended with vinylic fillers. Vinylic fillers are polymerized, crosslinked, rigid particles containing organic surfaces. These particles are treated with a water solution of the leuco derivative of dyestuffs, followed by insolubilization and deposition of the dye, such as by oxidation, with adsorption onto the particle surface. The cationized pigments can be used in a variety of applications, such as for printing inks or plastics. One drawback to the use of cationic dyes is the obvious additional cost and complexity of reacting the dyestuffs with metal cations, or cationic polymers, as well as the toxicological, and prodegradative effects these cationic materials themselves can have on polymers.

U.S. Pat. No. 5,326,622 discloses an inked heat transferable ribbon containing an ink layer providing a colorant, a binder, and a pressure sensitive adhesive. The colorant located in the ink layer is dispersed in a binder of a wax and a tackifying resin, and is selected from the group consisting of carbon black, iron oxide, white lead, red lead, chrome yellow, vermilion, ultramarine blue, iron blur, cobalt oxide, strontium chromate, titanium yellow, black-titanium oxide, black iron oxide, molybdenum white, lithopone, cobalt blue, azo, phthalocyanine blue, lake, isoindolinone, quinacridone, dioxazinevviolet, perinone, perylene, disperse dyes, cationic dyes, basic dyes, acid dyes, metal complex dyes, reactive dyes, direct dyes, sulphur dyes, sulphur vat dyes, vat dyes, azoic dyes, solvent dyes and pigment resin colors. The control layer, above the ink layer contains thermoplastic resin and a tackifying resin. This layer has a higher viscosity, heat sensitive adhesiveness, and hardness than said ink layer. Thermoplastic resin used in the control layer is chosen from ethylene-vinyl acetate copolymer, poly(vinylacetate), ionomer, acrylic polymer, ethylene-ethyl acrylate copolymer, ethylene-ethyl acrylate copolymer, vinyl chloride-vinyl acetate copolymer, poly(vinyl butyral), poly (vinylpyrrolidone), poly(vinyl alcohol), polyamide, ethyl cellulose and polyolefin.

GB application no. 9517103.9 discloses the use of micron-sized, oxidized sulfur pigments as antioxidant in polymers, e.g., polyolefins. Further stabilizers suggests as adjuncts with sulfur dyes include benzofuran. The working examples illustrate that a masterbatch of sulfur brown 96 which is incorporated into polypropylene (PP), and extruded five times, shows a comparable increase in melt viscosity as compared to unstabilized PP and PP containing a well known phenolic antioxidant. No long-term heat aging data was provided.

It has been found that fine particle-sized sulfur black in its oxidized state provides no inherent antioxidative effect alone in polyolefins. A surprising synergistic improvement in long term heat aging of stabilized polyolefin is observed, as measured by oxygen induction time and oven heat aging when non-cationized, nonsilylated sulfur black is combined with a phenolic antioxidant and sulfur-containing secondary antioxidant, in comparison to carbon black together with the same stabilizer package. Still further unexpected improvement in long term heat aging is realized when a hindered amine is added to the non-cationized, nonsilylated sulfur black, phenolic antioxidant and secondary antioxidant. Furthermore, when non-cationized, non-silylated sulfur black is treated by washing and reducing the level of sodium salts, together with a lowering of pH to below 7, this treatment provided further unexpected improvements in the long term heat aging of polyolefins.

SUMMARY OF THE INVENTION

Polyolefin compounds and articles therefrom according to the invention comprise, in a conventional solid, melt-phase compounding, and in the absence of carbon black, containing oxidized, non-cationized, non-silylated sulfur black pigment, a phenolic antioxidant and a sulfur-containing secondary stabilizer, each in stabilizing amount, specified below, which provide a synergistic improvement in the long term heat aging of polyolefins.

In another aspect, the invention comprises the melt-phase compounding of polyolefins and molded articles made therefrom comprising incorporating of carbon black, oxidized, non-cationized sulfur black pigment, a phenolic antioxidant and sulfur-containing secondary stabilizer.

In a third aspect, there is provided a melt-phase mixed polyolefin compound comprising resin, washed, non-cationized, oxidized sulfur black, together with a phenolic antioxidant and sulfur-containing compound.

According to another aspect of the invention, a heat stabilizing composition for a polyolefin, and the polyolefin compound formed thereby, includes an oxidized, non-cationized, non-silylated sulfur black pigment, a hindered phenolic antioxidant, a sulfur-containing secondary stabilizer, and a hindered amine.

In another aspect, a method for increasing the long term heat aging stability of a polyolefin resin comprises the steps of adding to the polyolefin resin an oxidized, non-cationized, non-silylated sulfur black pigment, a hindered phenolic antioxidant, a sulfur-containing secondary stabilizer, and a hindered amine.

According to a further aspect, a method for increasing the long term heat aging stability of a polyolefin resin comprises the steps of reducing the concentration of water soluble salts in a sulfur black pigment to form a treated sulfur black pigment, and adding the treated sulfur black pigment, a hindered phenolic antioxidant, a sulfur-containing secondary stabilizer, and a hindered amine to the polyolefin resin.

The polyolefin compounds formed by the heat aging stability composition of present invention exhibit a significant, unexpected improvement in long term heat aging, while maintaining the color characteristics required for consumer acceptance.

BRIEF DESCRIPTION OF THE DRAWINGS

FIG. 6 is a photo micrograph at 40× of the fractured corner surfaces of molded plaques from Examples 3 and 4 after exposure of 48 hours at 150° C. oven aging.

DETAILED DESCRIPTION OF THE PREFERRED EMBODIMENTS

Figure 1:
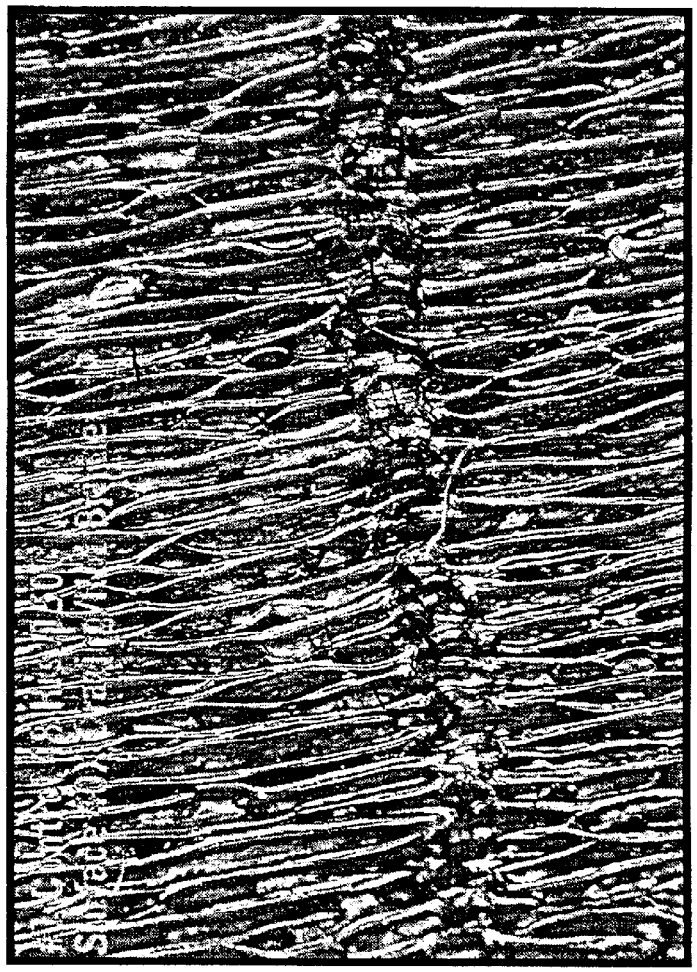
FIG. 1 is a photo micrograph at 40× of the surface of molded plaque from Example 1 after exposure of 48 hours at 150° C. oven aging.

The invention pertains to, dry-blended, melt-phase compounded poly α-olefins, especially polyethylene and polypropylene homopolymers. Polyolefins as poly α-olefin homopolymers include polyethylene, polypropylene, poly-1-butene, polyisobutene, poly-3-methyl-1-butene, poly-4-methyl-1-pentene, cyclic polyolefins, and the like. Examples of poly α-olefin copolymers are ethylene/propylene copolymer, ethylene/1-butene copolymer, propylene/4-methyl-1-pentene copolymer, propylene/1-butene copolymer, 1-decene/4-methyl-1-pentene copolymer, ethylene/propylene/1-butene ethylene/propylene/1-octene copolymers, and the like. Also included are copolymers which comprise, in addition to an.alpha.-olefin, a polyunsaturated compound such as a conjugated diene or an unconjugated diene, or a monounsaturated compound such as acrylic acid, methacrylic acid or vinyl acetate, as a copolymerizable ingredient. These polymers may be modified by an acid, for example, they may be graft-modified with an α, β-unsaturated fatty acid, an alicyclic carboxylic acid, or a derivative thereof.

The present invention can accommodate a wide variety of polyolefin resins. Accordingly, resins having a reactor-grade melt flow index, or a visc-cracked (controlled rheology) melt flow of from 0.6 to 15 (0.6 MF to 15 MF) may be used, preferably from 1.8 MF to 10 MF. An advantage of the present invention is that while 1 MF to 2 MF resins are typically employed in thermoforming, now resins having a melt flow index of 2.5 or greater, preferably 2.75 to 10 may be employed to take advantage of the desirable performance characteristics of those resins. Commercially available polypropylene has a molecular weight ranging upward to 1,000,000 with a molecular weight distribution of 2 to 14, preferably from 6 to 12. For the high speed spinning and fiber forming of polypropylene, a molecular weight of about 160,000 with a distribution of 2.5 to 4.5 is preferred, whereas in injection molding a molecular weight in the range of 150,000 to 400,000 with a molecular weight distribution of 3.5 is preferable.

Sulfur black pigments (A) used in the invention are dyes that contain aromatically bound oligosulphide bridges that are reducible to thiol groups and may optionally be of oligomeric to polymeric structure. They are essentially free of any solubilising sulpho groups (and also free of any thiosulphonic acid groups).

Sulphur dyes that can preferably be used are those selected from: C. I. Sulphur Black 1; C. I. Sulphur Black 2; C. I. Sulphur Black 11; and C. I. Sulphur Black 18.

More preferred sulphur dyes are those containing 1–10 units, in which said unit contains a group of the formula

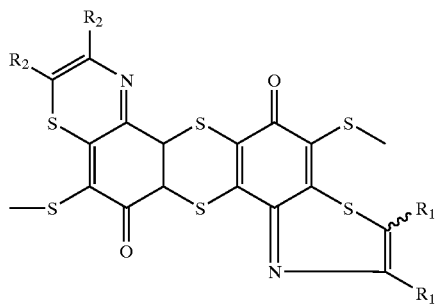

where both groups $R_1$ and both groups $R_2$ together with the carbon atoms to which they are attached form a phenyl or naphthyl group. The most preferred sulphur dyes contain 1 to 10 recurring units of formula 1 or 2

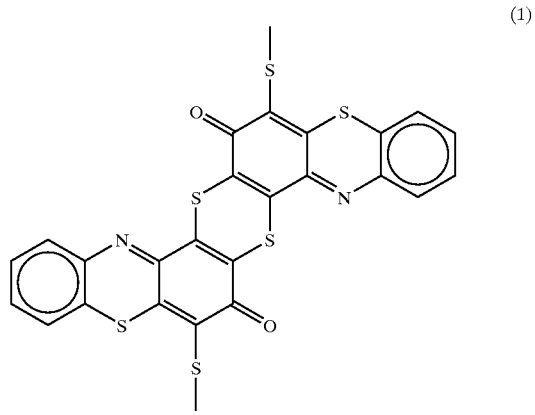

(1)

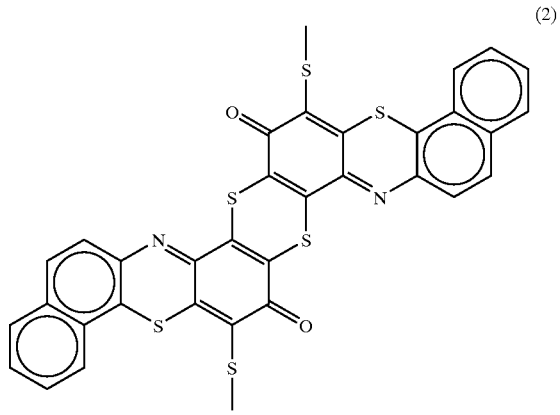

(2)

The phenolic antioxidant stabilizer (B) is hindered and is incorporated into the polyolefin polymer in a stabilizing amount, said stabilizer generally being present in an amount of from about 0.01 to 1 part by weight and preferably from about 0.1 to 0.5) parts by weight. Representative examples of suitable phenol antioxidant stabilizers include, but are not limited to:

2,6-di-butyl-4-methylphenol; 2,6-di(α-methylbenzyl) 4-methylphenol;
4-hydroxymethyl-2,6-di-t-butyl phenol; butylated hydroxyanisole;
2,6-bis(1,1-dimethylethyl)-4-methyl phenol;
2-t-butyl-1,4-benzenediol;
octadecyl 3,5-di-t-butyl-4-hydroxybenzyl phosphonate;
ethylene 3,3-bis(3-tert-butyl-4-hydroxyphenyl) butyrate (HOSTANOX O3);
the bisphenols such as 2,2'-methylenebis(4-methyl-6-t-butylphenol);
2,6-di-tert-butyl-4-methylphenol (BHT);
2,6-di-tert-butyl-4-hydroxymethylphenol (ETHANOX 754);
4,4'-butylidenebis[3-methyl-6-tert-butylphenol] (SUMILIZER BBM) (VANOX SWP);
2,2'-butylidenebis[4-methyl-6-tert-butylphenol] (SUMILIZER BBP);
4,4'-methylenebis(2,6-di-tert-butylphenol) (ETHANOX® 702);
2,2'-methylenebis (4-methyl-6-nonylphenol);
2,2'-methylenebis [4-methyl-6-(1-methylcyclohexyl) phenol] (NONOX WSP);
2,2'-bis(4-hydroxy-3-methylphenyl) propane (NONOX DCP);
2,2'-oxalyidiamidobisethyl 3-(3,5-di-tert-butyl-4-hydroxyphenyl) propionate (NAUGARD XL 1);
2,2'-methylenebis(4-ethyl-6-tert-butylphenol) (CYANOX 425);
2,2'-methylenebis[6-(1-methylcyclocyclohexyl)-p-cresol];
4,4'-thiobis(6-t-butyl-o-cresol);
2,2'-thiobis[4,6-di-tert-butyl-m-cresol] (TOPANOL® TP);
2,2'-thiobis[4,6-di-tert-butyl-o-cresol] (SANTANOX® R)
4,4'-thiobis (3-methyl-6-t-butyl phenol) (IRGANOX 415) (SEENOX® BCS);
thiobisdiethylenebis(3,5-di-t-butyl-4-hydroxy) hydrocinnamate (IRGANOX 1035);
butyric acid, 3,3-bis(3-t-butyl-4-hydroxyphenyl) ethylene ester;
2,2'-ethylidenebis(4,6-di-t-butylphenol);
2,2'-thiobis(4-methyl-6-tert-butylphenol) (IRGANOX 1081);
bis[4-(2-phenyl-2-propyl)phenyl] amine (NAUGARD 445);
N,N-dimethyl(3,5-di-tert-butyl-4-hydroxybenzyl) amine (ETHANOX 703);
4,4'-di-tert-octyidiphenylamine (VANOX 1081);
1,1-bis(2-hydroxy-3,5-dimethylphenyl)-3,5,5-trimethylhexane (NONOX® WSO); and
1,6-hexamethylene bis[3-(3,5-di-tert-butyl-4-hydroxyphenyl) propionate] (IRGANOX L 09);
the polyphenols, like 1,3,5-tris(4-t-butyl-3-hydroxyl-2,6-dimethylbenzyl)-1,3,5-triazine-2,4,6-(1 H, 3H, 5H)-trione;
tetrakis[methylene (3,5di-t-butyl-4-hydroxy) hydrocinnamate]methane;
1,3,5-tris(3,5-di-tert-butyl-4-hydroxybenzyl)-s-triazine-2,4,6 (1H, 3H, 5H)-trione (GOOD-RITE 3114);
1,3,5-tris(2,6-dimethyl-3-hydroxy-4-tert-butylbenzyl) iso-cyanurate (CYANOX® 1790);
trimethyl-2,4,6-tris(3,5,-di-t-butyl-4-hydroxybenzyl) benzene);
tris(3,5,-di-t-butyl-4-hydroxybenzyl) isocyanurate;
tris(3,5-di-tert-butyl-4-hydroxyphenyl) phosphate (ETHANOX® 796);
hydrocinnamic acid, 3,5-di-t-butyl-4-hydroxy-, triester with 1,3,5-tris(2-hydroxyethyl)-s-triazine-2-4,6-(1H, 3H, 5H)-trione (GOOD-RITE® 3125);
1,1,3-tris ((2-methyl-4-hydroxy-5-t-butylphenyl)butane) (TOPANOL CA);
3,5-bis((3,5-di-tert-butyl-4-hydroxy)benzyl)-2,4,6-trimethylphenol (IRGANOX® 1299); and pentaerythritol tetrakis(3,5-di-tert-butyl-4-hydroxyphenyl) propionate(IRGANOX 1010);
and other suitable antioxidants, including calcium bis(ethyl 3,5-di-tert-butyl-4-hydroxybenzylphosphonate) (IRGANOX 1425);
o,o-dimethyl o-(4-cyanophenyl) phosphorothioate (SUMITOMO S 4084);
terephthalic acid, 1,4-dithio-,S,S-bis(4-tert-butyl-3-hydroxy-2,6-dimethylbenztl) ester (CYANOX 1729);
triethylene glycol bis(3-tert-butyl-4-hydroxy-5-methylhydrocinnamate)(AO 70);
hexamethylene bis(3,5-di-tert-butyl-4-hydroxyhydrocinnamate (IRGANOX 259);
1,2-bis(3,5,di-tert-butyl-4-hydroxyhydrocinnamoyl) hydrazide (IRGANOX 1024);
4,4'-di-tert-octyldiphenamine (NAUGALUBE® 438R);
phosphonic acid, (3,5-di-tert-butyl-4-hydroxybenzyl)-, dioctadecyl ester (IRGANOX 1093);
1,3,5-trimethyl-2,4,6-tris(3',5'-di-tert-butyl-4'hydroxybenzyl)benzene (IRGANOX 1330);
2,4-bis(octylthio)-6-(4-hydroxy-3,5-di-tert-butylanilino)-1,3,5-triazine (IRGANOX 565);
isooctyl 3-(3,5-di-tert-butyl-4-hydroxyphenyl)propionate (IRGANOX 1135);
octadecyl 3-(3,5-di-tert-butyl-4-hydroxyphenyl)propionate (IRGANOX 1076);
3,7-bis(1,1,3,3-tetramethylbutyl)-10H-phenothiazine (IRGANOX LO 3);
2,2'-methylenebis(4-methyl-6-tert-butylphenol) monoacrylate (IRGANOX 3052);
2-tert-butyl-6-[1-(3-tert-butyl-2-hydroxy-5-methylphenyl) ethyl]-4-methylphenyl acrylate (SUMILIZER TM 4039);
2-[1-(2-hydroxy-3,5-di-tert-pentylphenyl)ethyl]-4,6-di-tert-pentylphenyl acrylate (SUMILIZER GS);
1,3-dihydro-2H-Benzimidazole (SUMILIZER® MB);
2-methyl-4,6-bis[(octylthio)methyl]phenol (IRGANOX 1520);
N,N'-trimethylenebis-[3-(3,5-di-tert-butyl-4-hydroxyphenyl)propionamide (IRGANOX 1019);
4-n-octadecyloxy-2,6-diphenylphenol (IRGANOX 1063);
2,2'-ethylidenebis[4,6-di-tert-butylphenol] (IRGANOX 129);
N N'-hexamethylenebis(3,5-di-tert-butyl-4-hydroxyhydrocinnamamide) (IRGANOX 1098);
diethyl (3,5-di-tert-butyl-4-hydroxybenxyl)phosphonate (IRGANOX 1222);
4-octyl-N-(4-octylphenyl)-benzenamine (ANOX NS);
4,4'-di-tert-octyldiphenylamine(IRGANOX 5057);
N-phenyl-1-napthalenamine IRGANOX L 05);
2,2,4-trimethyl-1,2-dihydroquinoline polymer (ANOX® HB);
tris[2-tert-butyl-4-(3-ter-butyl-4-hydroxy-6-methylphenylthio)-5-methyl phenyl] phosphite (HOSTANO) OSP 1);
zinc dinonyidithiocarbamate (HOSTANOX VP-ZNCS 1); and
3,9-bis[1,1-diimethyl-2-[(3-tert-butyl-4-hydroxy-5-methylphenyl)propionyloxy]ethyl]-2,4,8,10-tetraoxaspiro[5.5]undecane (SUMILIZER® AG80).

The preferred antioxidants are pentaerythritol tetrakis(3-(3,5-di-tert-butyl-4-hydroxyphenyl)propionate, sold as HOSTANOX® O 10; 1,3,4-tris(4-t-butyl-3-hydroxy-2,6-dimethylbenzyl)-s-triazine-2,4-(1H, 3H, 5H)-trione, or a mixture, and most preferred is 1,3,5-tris(4-t-butyl-3-hydroxy-2,6-dimethylbenzyl)-s-triazine-2,4-(1H, 3H, 5H)-trione.

The sulfur containing secondary antioxidant (C) are referred to as β-thioesters (—S—C—C—C(O)—OR) and thioethers(R—S—R), (R=Alkyl), for example, dialkyl thio-dipropionates. Some sulfur-containing secondary antioxidants conform to the structures C' and C":

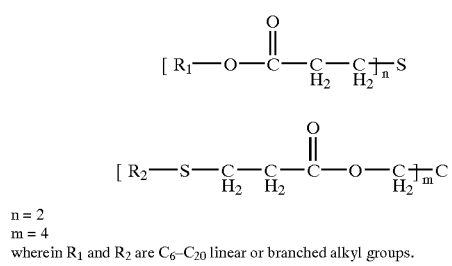

(C')

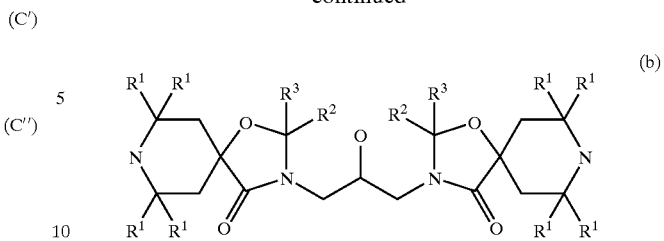

(C'')

n = 2
m = 4
wherein $R_1$ and $R_2$ are $C_6$–$C_{20}$ linear or branched alkyl groups.

wherein $R_1$ and $R_2$ are $C_6$–$C_{20}$ linear or branched alkyl groups.

Examples of sulfur-containing secondary antioxidants include sulfides, disulfides, specifically:

2,2'-thiobis(4-methyl-6-tert-butylphenol) (IRGANOX 1081);
tetrakis(3-laurylthiopropionyloxymethyl)methane;
pentaerythritol tetrakis(3-alkylthiopropionate) wherein alkyl is $C_{6-20}$ carbon atoms, e.g. pentaerythritol tetrakis(3-dodecylthiopropionate) (SEENOX 412S);
lauryl 3,3'-thiodipropionate (IRGANOX PS 800);
stearyl 3,3'-thiodipropionate (SEENOX DS);
distearyl disulfide (HOSTANOX SE 10);
dilauryl 3,3'-thiodipropionate (DLDTP) (ADVASTAB 800);
dimyristyl 3,3'-thiodipropionate;
propionic acid, 3,3'-thiobis-, didodecyl ester (SUMILIZER® TPL) (SEENOX DL);
ditridecyl 3,3'-thiodipropionate (CYANOX® 711);
distearyl 3,3'-thiodipropionate (STDP), or dioctadecyl 3,3-thiodipropionate (ADVASTAB 802); and
dimyristyl 3,3'-thiodipropionate (SEENOX DM), to name a few.

These thioester and thioether co-stabilizers are widely available commercially.

The hindered amine (D) may be any sterically hindered secondary or tertiary amine, or a combination thereof. In one preferred form, the hindered amine (D) is at least one UV stabilizer and a polymeric reaction product of (a) and (b):

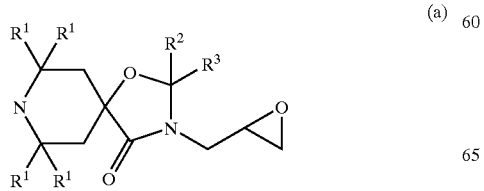

(a)

which comprises polymer (c):

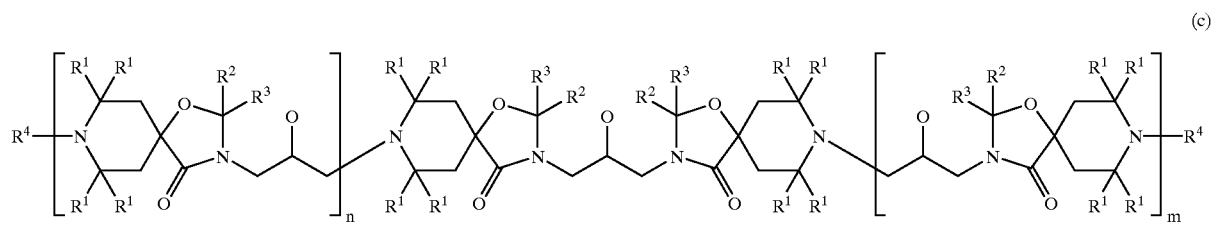

(b)

(c)

in which n and m are independently 0 to 100, with the proviso that n and m cannot both be 0, $R_1$ is hydrogen, $C_5$–$C_7$-cycloalkyl, or a $C_1$–$C_{12}$-alkyl group,
$R^2$ and $R^3$ independently of one another are a hydrogen atom or a $C_1$–$C_{18}$-alkyl group or, together with the carbon atom connecting them, a 5- to 13-membered hindered amino group, and
$R^4$ is either hydrogen or a $C_1$–$C_5$-alkyl group, an oxygen radical O*, —OH, —NO, —$CH_2CN$, benzyl, allyl, a $C_1$–$C_{10}$-alkyloxy group, a $C_5$–$C_6$-cycloalkyloxy group, a $C_6$–$C_7$-aryloxy group in which additionally the aryl radical can also be substituted, a $C_7$–$C_{10}$-arylalkyloxy group in which additionally the aryl radical can also be substituted, a $C_3$–$C_6$-alkenyl group, a $C_3$–$C_6$-alkynyl group, a $C_1$–$C_4$-acyl group, halogen or $C_7$–$C_9$-phenylalkyl which is urisubstituted or substituted on the phenyl ring by $C_1$–$C_2$-alkyl.

Exemplary hindered amino groups of $R_2$ and $R_3$ are (i) to (x):

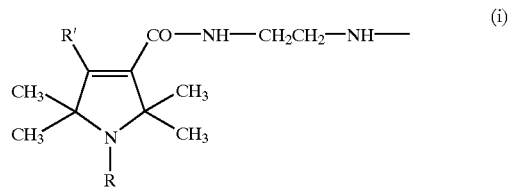

(i)

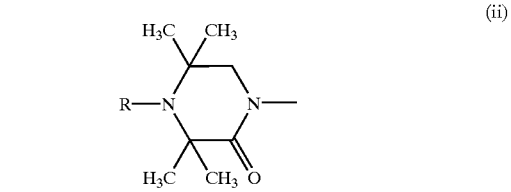

(ii)

-continued

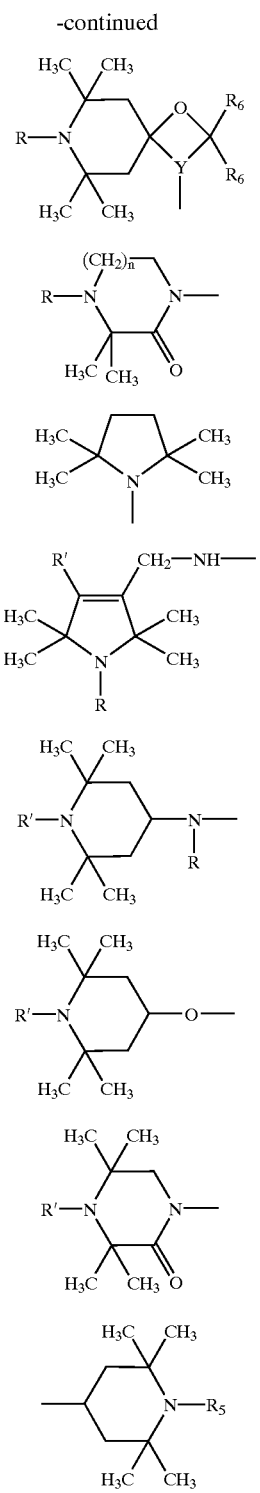

wherein R, R' and $R_5$ are independently either hydrogen, $C_{1-12}$ alkyl, $C_{1-18}$ alkoxy, $C_{1-10}$ acyl or —$COR_3$,
where $R_3$ is hydrogen, $C_{1-6}$alkyl, phenyl, —COO($C_{1-4}$alkyl), OH, $CH_2CN$, $Cp_1$–$C_{18}$ alkoxy, $C_5$–$C_{12}$ cycloalkoxy, $C_3$–$C_6$ alkenyl, $C_7$–$C_9$ phenylalkyl unsubstituted or mono-, di- or tri-substituted on the phenyl by $C_1$–$C_4$alkyl, aliphatic or aromatic $C_1$–$C_{10}$acyl or $NR_{15}R_{16}$, where $R_{15}$ and $R_{16}$ are independently hydrogen, $C_{1-12}$ alkyl, $C_{5-6}$ cycloalkyl, phenyl or ($C_{1-12}$ alkyl) phenyl, or $R_{15}$ and $R_{16}$ together with the N-atom to which they are attached form a five- to seven-membered ring which may contain an additional N- or O-atom (preferably forming a piperidine or morpholine ring);
n in (iv) is 0 or 1;
Y in (iii) is the group —NCO or —OCN, where CO forms part of the cyclic structure; each $R_6$ of structure (iii) independently is selected from hydrogen, $C_{1-12}$ alkyl or phenyl provided only one $R_6$ can be phenyl, or both groups $R_6$ together form the group —$(CH_2)_m$—; where m is 2 to 11, —$C(CH_3)_2$—, —$C(CH_3)_2$—$CH_2$—$CH_2$—or —$C(CH_3)CH_2CH_2CH(CH_3)$—. Preferably R is hydrogen, $C_1$–$C_8$alkyl;

Preferred polymers of (c) are those in which n and m are independently 0 to 10, with the proviso that n and m cannot both be 0,
$R^1$ is hydrogen, $C_6$-cycloalkyl, or a $C_1$–$C_4$-alkyl group,
$R^2$ and $R^3$ independently of one another are a hydrogen atom or a $C_1$–$C_8$-alkyl group, or, together with the carbon atom connecting them, are a 6- to 12-membered ring or, together with the carbon atom connecting them, are a group of the formula (IV),
$R^4$ and $R^5$ independently of one another are either hydrogen or a $C_1$–$C_5$-alkyl group,
an oxygen radical O*, —OH, —NC), —$CH_2CN$, benzyl, allyl, a $C_1$–$C_{10}$-alkyloxy group, a $C_5$–$C_6$-cycloalkyloxy group, a $C_6$–$C_7$-aryloxy group in which additionally the aryl radical can also be substituted, a $C_7$–$C_{10}$-arylalkyloxy group in which additionally the aryl radical can also be substituted, a $C_3$–$C_6$-alkenyl group, a $C_3$–$C_6$-alkyriyl group, a $C_1$–$C_4$-acyl group, halogen or $C_7$–$C_9$-phenyialkyl which is unsubstituted or substituted on the phenyl ring by $C_1$–$C_2$-alkyl.

Other preferred hindered amines include, for example bis-(2,2,6,6-tetramethylpiperidyl) sebacate, bis-(1,2,2,6,6-pentamethylpiperidyl) sebacate, nbutyl-3,5-di-tert butyl-4-hydroxybenzyl malonic acid bis-(1,2,2,6,6-pentanemethylpiperidyl) ester,condensation product of 1-hydroxyethyl-2,2,6,6-tetramethyl-4-hydroxypiperidine and succinic acid, condensation product of N,N'-(2,2,6,6,-tetramethylpiperidyl)-hexamethylenediamine and 4-tert-octylamino-2,6-dichloro-s-triazine, tris-(2,2,6,6, tetramethylpiperidyl)-nitrilotriacetate, tetrakis-(2,2,6,6,-tetramethyl-4-piperidyl) 1,2,3,4-butanetetracarbonylate, 1,1' (1,2-ethanediyl)-=bis-(3,3,5,5,-tetramethylpiperazinone), and alkyl[3-[2,2,6,6,-tetramethyl-4-piperidinyl)propyl] sillanediol homopolymer for example Uvasil 299.

Alternatively, the hindered amine (D) may be a hindered amine light stabilizer (HALS) including, but not limited to those described in commonly assigned U.S. Pat. Nos. 6,153,676; 6,126,736; 5,874,493; and, 5,705,545, the disclosures of which are all hereby incorporated herein by reference.

In addition to the primary (B) and secondary (C) antioxidant stabilizers, sulfur black (A), and hindered amine (D), other compounding additives can be included, such as but riot limited to carbon black, processing stabilizers, light stabilizers, metal deactivators, metal soaps, nucleating agents, antistatic agents, lubricants, flame retardants, releasing agents, mildew resistant agents, etc., so long as they do not hinder the properties of the composition. Exemplary processing stabilizers include 2-t-butyl-6-(3-t-butyl-2-hydroxy-5-methylbenzyl)-4-methylphenyl acrylate, and 2-[1-(2-hydroxy-3,5-di-t-pentylphenyl)ethyl]-4,6-di-t-pentylphenyl acrylate.

A synergistic improvement in heat and light stability is provided by the combination of polyolefin, sulfur black, hindered phenolic, sulfur-containing secondary stabilizer, hindered amine and benzophenone-type light stabilizer. Exemplary benzophenone light stabilizers include:

2-hydroxy-4-dodecyloxybenzophenone (SYNTASE® 1200);
2,4-dihydroxybenzophenone (SYNTASE 100);
2-(4-benzoyl-3-hydroxyphenoxy) ethyl acrylate (CYASORB® UV 209);
2-hydroxy-4-n-octyloxy)benzophenone (CYASORB 531);
2,2'-dihydroxy-4-(octyloxy)benzophenone (CYASORB UV 314);
hexadecyl-3,5-bis-tert-butyl-4-hydroxybenzoate (CYASORB UV 2908);
2,2'-thiobis(4-tert-octylphenolato)-n-butylamine nickel(II) (CYASORB UV 1084);
3,5-di-tert-butyl-4-hydroxybenzoic acid, (2,4-di-tert-butylphenyl) ester (CYASORB 712); and
4,4'-dimethoxy-2,2'-dihydroxybenzophenone (CYASORB UV 12).

Besides the aforementioned additives, there may be additional suitable other light stabilizers of the beinzotriazole class, for example 5-chloro-2-(2-hydroxy-3,5-di-tert-butylphenyl)-2H-benzotriazole (CYASORB UV 5357). These may be phosphorus (III) compounds, phosphites, phosphonites or phosphinites. They may contain one or more phosphorus ester groups. Preferably a triorganophosphite is added. Examples of phosphorus(III) esters of this type are: triphenyl phosphite, decyl diphenyl phosphite, phenyl didecyl phosphite, tris(nonylphenyl) phosphite, trilauryl phosphite, trioctadecyl phosphite distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, tristearyl sorbitol triphosphite, tetrakis(2,4-di-tert-butylphenyl)-4,4'-biphenylene diphosphonite, bis(2,6-di-tert-butyl-4-methylphenyl) pentaerythritol diphosphite.

In addition to the hindered amine (D), additional acid acceptors are recommended and include, glycerol mono- and distearates, metallic oxides and stearates, optionally epoxies, and MgAlOH carbonates.

The proportion of sulfur black incorporated in the resin is not particularly limited, but generally, on the basis of the desired pigmentation level and relative to the total weight of the polyolefin resin containing compound, an effective amount of sulfur black is 0.1–10 w/w %, and preferably from 0.25% to 3%. Beyond about 3%, little added benefit is seen. If the amount of sulfur black is less than 0.05 w/w %, then the desired coloring and synergistic effect may not be adequately achieved, and if it is over 10 w/w %, then there may tend to be a loss in the mechanical strength.

Furthermore, according to the present invention a fibrous and/or nonfibrous reinforcement or filler may be incorporated therein together with carbon black. Specific examples of the inorganic reinforcers and fillers which may be used are glass fiber, stainless steel fiber, talc, mica, titanium oxide, zinc oxide, zinc sulfide, aluminum hydroxide, calcium carbonate, magnesium carbonate, calcium sulfate, barium sulfate, magnesium silicate, cerite, kaolin, zeolite, silica, asbestos, glass fiber, carbon fiber, barium titanate, lead titanate, and the like. The reinforcers and/or fillers may be used each alone or by combining 2 or more thereof together.

The amounts of each of the components (A), (B), (C) and (D) are not particularly limited, but their respective preferred amounts for use are, based on 100 parts by weight of the polyolefin resin, include from 0.1 to 10 parts sulfur black (A), 0.01–1 parts by weight of the hindered phenolic compound (B), 0.02–2 parts by weight of the organic sulfur co-stabilizer compound (C), and 0.05 to 1.0 parts by weight of the hindered amine. The ratio of amount of component (B) to component (C) is preferably from 1:1 to 1:10, more preferably from 1:3 to 1:6. In an alternative embodiment, carbon black is used at 0.5 to 3% by weight, sulfur black is used at from 0.1–1%, while the amount of sulfur-containing co-stabilizer is reduced to 0.02–0.3 parts by weight.

The amounts of sulfur black (A) in the absence of carbon black, of less than 0.5 weight %, the amount of phenolic compound (B) less than 0.01 weight %, the organic sulfur compound (C) less than 0.02 weight % and that of the hindered amine (D) less than 0.05% is inadequate, whereas amounts of (A) exceeding 2.5 weight %, (B) above 2 weight %, (C) above 1 weight % and (D) above 1.0%, respectively, will not produce much improvement enough for the excess amounts, and is uneconomical. In order to effectively exhibit synergistic improvement of the combination (A), (B), (C) and (D) in the long term heat aging effects require an amount at least of (A) of 0.5 part by weight or more per 100 parts by weight of the polyolefin resin when carbon black is absent.

In another aspect of the invention, the components (A), (B), (C) and (D) may be mixed in a polyolefin carrier as a masterbatch. The masterbatch may contain the stabilization system required for the end use application.

Preferably, the heat stabilizing composition is present in the masterbatch in amount between approximately 20% and 50% by weight.

In one embodiment, it was found that polyolefin compound containing sulfur black which has been treated for reduction of water soluble salts exhibits superior heat aging properties over conventional untreated sulfur black. A press cake of sulfur black is subjected to a fluid energy mill with water at 60° C. A suitable fluid energy mill is a Fluid Energy MICRO-JET®, model no. 8. The extent of washing is found to be proportional to conductivity of the filtrate. Conductivity after treatment of from about 100–3500 $\mu$S/cm, and preferably from 100–500 $\mu$S/cm, and pH which is reduced from alkaline, above 8 to below 6, preferably 4.5–5.5 pH, is sufficient to impart improved performance in the polyolefin compound compared to untreated sulfur black. The washed sulfur black solid is dried by conventional means, such as flash drying, or slow convective drying. The levels of sodium remaining should be reduced to at least one-half of the level in the untreated form. Preferably the amount of sodium metal remaining is below 5% by weight, more preferably less than 3% by weight of sulfur black which has been treated for reduction in water soluble salts.

The oxidized sulphur dye is incorporated by known methods into the polyolefin, such as by dry-blending of the sulphur dye powder with the polymer fluff and melt processed by twin screw extruder. Melt-phase blending of the sulphur dye, other stabilizers and adjuncts can be done in compounding extruders, Farrell®-type continuous mill, Banbury mill, Buss® and the like, wherein a homogeneous dispersion and extrusion into pellets are produced. Pellets are fed into molders, extruders, calendaring rolls and shaped into the desired articles, including foils, films, profiles, tubes, containers, bottles, fibers and shaped foams by extrusion, injection moulding, blow moulding, roto-moulding, spinning or wire coating.

Finished shaped polyolefin articles stabilized according to the invention are surprisingly superior to carbon-black pigmented articles according to the prior art in respect of their substantially longer service life at high temperatures such as encountered in automotive under-hood uses.

Conventional shaping processes for making long term heat aging articles using the composition of the present invention include, extrusion, injection molding, blow-moldinc, thermoforming, foaming, compression molding, hot-stamping, and the like which are conventionally used. Among the many shaped articles that can be formed, there are structural and non-structural uses well suited for under the hood applications, including fan shrouds, supporting members, wire and cable jacketing, covers, housings, battery pans, battery cases, flexible ducting, electrical housings, fuse buss housings, blow-molded containers, geomembranes, geotextiles, pond liners, to name a few.

A polyethylene foam structure can be formed by melting and mixing the polymer compound itself or with other polymers if present, to form a plastic melt, incorporating a blowing agent into the plastic melt to form a foamable gel, and extruding the foamable gel through a die to form the foamed structure. During melting and mixing, the polymers are heated to a temperature at or above the glass transition temperature and preferably above the melting point of the polymer. Melting and mixing of polymers and any additives is accomplished by any means known in the art such as with an extruder, mixer, or blender. Likewise, the blowing agent, including water, is incorporated or blended into the plastic melt by any of the same above-described means. The blowing agent is blended with the plastic melt at an elevated pressure sufficient to prevent substantial expansion of the resulting plastic gel or loss of generally homogeneous dispersion of the blowing agent within the gel. The blowing agent is incorporated into the melt in a weight proportion of between about 1 to about 30 parts and preferably from 3 to 15 parts per hundred parts of the polymer to be expanded. Blowing agents which may be utilized include inorganic agents, volatile organic agents, and chemical agents which decompose into a gas or other byproducts. Suitable gaseous blowing agents include, but are not limited to nitrogen, carbon dioxide, air, krypton, and argon. Suitable volatile organic agents include halogenated and nonhalogenated aliphatic hydrocarbons. The foam gel is preferably passed through a cooler or cooling zone to lower the gel temperature to an optimum foaming temperature.

An exemplary low density polyethylene foam comprises a polyethylene resin; a blowing agent comprising a blend of about 50% by weight of carbon dioxide and about 50% by weight of either normal butane, isobutane, propane, or a mixture of any two or all three hydrocarbons in admixture with the resin compound in a ratio of about one part blowing agent to about 10 parts resin; zinc oxide nucleation agent in an amount of from about 0.05 to 0.5 kg per 100 kg of the resin; and glycerol monostearate aging modifier in an amount of from about 0.5 to 5 kg per 100 kg of the resin compound including the aforementioned components (A), (B), (C), and (D).

The thermo-oxidative behavior of compounded polypropylene under melt conditions, measured by oxygen-induction testing, when containing sulphur dye alone, shows that sulfur black exhibits minimal antioxidative stability, and about equal to carbon black, and is not part of the present invention. It is critical that the polyolefin containing sulfur black also contain components (B) and (C) as an additional stabilizer combination, and the hindered amine (D). The combination of sulfur black, hindered amine, hindered phenolic and thioester co-stabilizer exhibits synergistic improvement in long term heat aging conditions at elevated temperatures below the melting point. A combination of carbon black, sulfur black, hindered amine, phenolic antioxidant and sulfur-containing co-stabilizer showed similar effect. The amount of sulfur black used was in an amount in partial substitution of the typical amount of sulfur-containing co-stabilizer.

The sulfur black and stabilizer system may be dry-blended straight with the polymer or in the form of a masterbatch-polymer concentrate, which is preferred.

EXAMPLES

Example 1

The following polypropylene homopolymer compounds were processed on a 30 mm twin screw extruder to form injection molded plaques.

Figure 2:
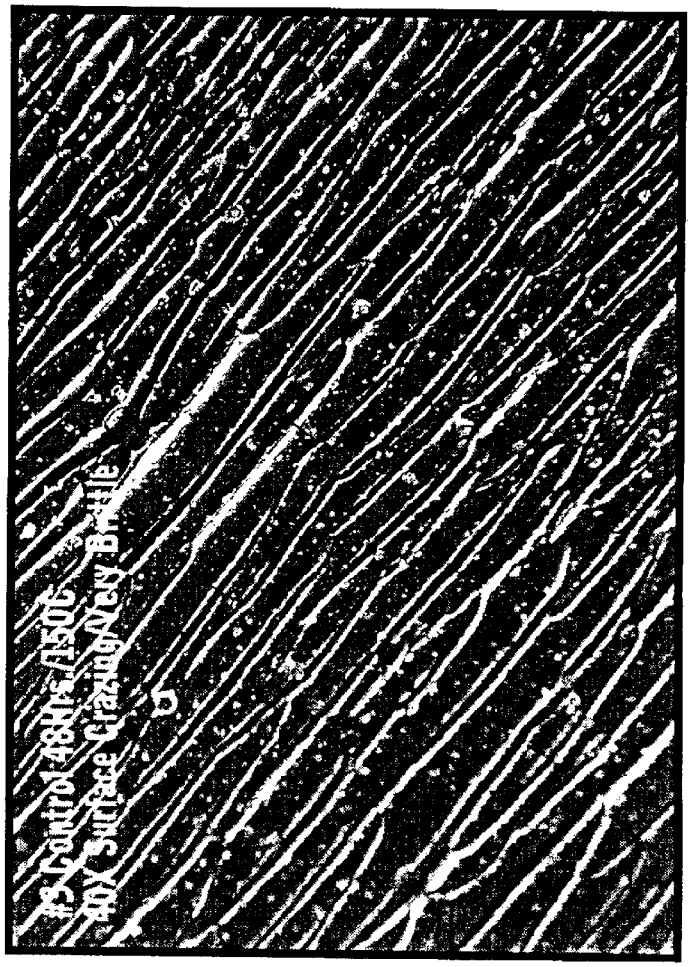
FIG. 2 is a photo micrograph at 40× of the surface of molded plaque from Example 3 after exposure of 48 hours at 150° C. oven aging.
Figure 3:
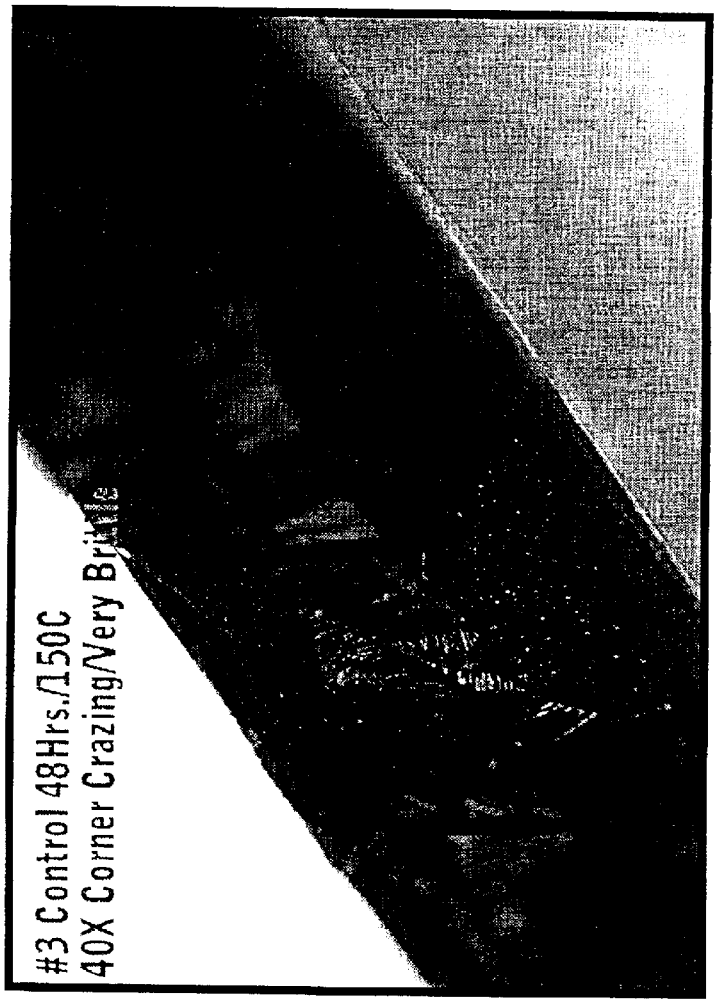
FIG. 3 is a photo micrograph at 40× of the fractured corner of a molded plaque from Example 3 after exposure of 48 hours at 150° C. oven aging.
Figure 4:
FIG. 4 is a photo micrograph at 40× of the fractured corner of a molded plaque from Example 4, containing unwashed sulfur black after exposure of 48 hours at 150° C. oven aging.
Figure 5:
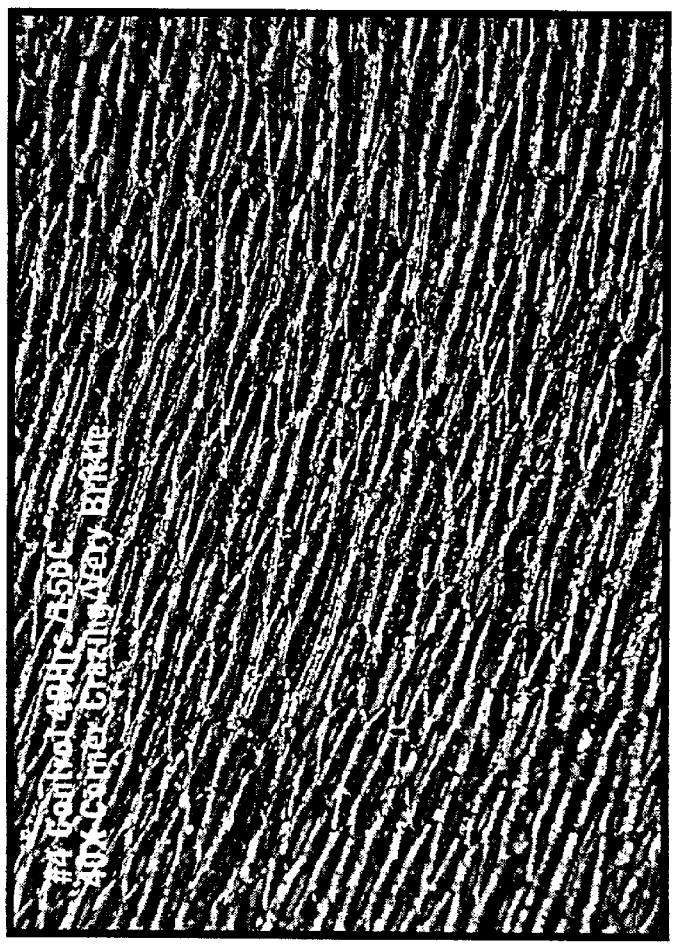
FIG. 5 is a photo micrograph at 40× of the surface of a molded plaque from Example 4 after exposure of 48 hours at 150° C. oven aging.

| | C1 | C2 | 3 | 4 |
|---|---|---|---|---|
| With Polypropylene* | 2.5% carbon black[1]<br>0.1% Cal. Stearate | 2.5% carbon black<br>0.1% phenolic A**<br>0.6% STDP<br>0.1% Cal. Stearate | 2.5% washed S-Black<br>0.1% Cal. Stearate | 2.5% unwashed S-Black[2]<br>0.1% Cal. Stearate |
| 60° gloss initial plaques | 82.95<br>See FIG. 1 | 83.25 | 80.80<br>SEE FIGS. 2, 3, 6 | 79.05<br>SEE FIGS. 4, 5, 6 |
| After oven aging Ox. Induction time | 17.06 min. | 19.92 min. | 16.65 min. | 16.44 min. |
| Percent improved OIT Versus C-1 | | 16.76% | −2.4% | −3.6% |
| Sodium salts level | | | 11.6 wt % in S.B. | 4.9 wt. % in S.B. |

| | 5 | 6 | 7 | 8 |
|---|---|---|---|---|
| Polypropylene* | 2.5% washed S-black<br>0.1% phenolic A<br>0.6% STDP<br>0.1% Cal. Stearate | 2.5% unwashed S-black<br>0.1% phenolic A<br>0.6% STDP<br>0.1% Cal. Stearate | 2.5% carbon black<br>0.3% washed S-Black<br>0.1% phenolic A<br>0.3% STDP<br>0.1% cal. Stearate | 2.5% carbon black<br>0.3% unwashed S-Black<br>0.1% phenolic A<br>0.3% STDP<br>0.1% cal. Stearate |
| 60° gloss (plaques) | 79.15 | 76.80 | 81.90 | 82.05 |
| $O_2$ Induction time | 24.78 min. | 22.44 min. | 20.30 min. | 20.57 min. |

-continued

| | | | | |
|---|---|---|---|---|
| % improved vs. C-2 vs. other | 28.48% 48.8% vs. Ex. 3 | 12.65% 36.49% vs. Ex. 4 | | |
| % of initial 60° gloss after 330 hrs. QUV | 26% | 50% | 100% | 100% |

*Himont 6301
**IRGANOX 1010
[1]Regal 660
[2]sulfur black 4G, ex Clariant

Oxygen Induction Time

Melt extruded pellets were treated at 190° C. using the procedure of oxidative induction time according to ASTM D 3895-95. The heating regimen included a programmed rate of 10° C. per minute and isothermal at 190° C. in a oxygen atmosphere with pressure of 500 p.s.i.g using a Dupont PDSC model 910. Sample size ranged from 5 to 6 mg. The test chamber of the differential scanning calorimeter was purged followed by an immediate change to oxygen at a flow rate of 20 cc's per minute to induce thermal-oxidative degradation. Oxidative Induction Time (OIT) is the time span in minutes between reaching an socratic temperature of 190° C. when the oxygen environment is introduced and the time at which the DSC detects the onset of oxidation.

Thermo-oxidative Stability at 150° C. of molded plaques in oven

ASTM D 5510-94 was followed to evaluate stability under hot air.

| Example | Time to degradation Detected | Observations |
|---|---|---|
| C-1 | 48 hours | Surface crazing - not brittle |
| C-2 | 432 hours | Surfaced crazing - brittle |
| 3 | 48 hours | Surface Crazing - very brittle |
| 4 | 48 hours | Surface Crazing - very brittle |
| 5 | 1024 hours | Crazed - brittle |
| 6 | 1024 hours | Surfaced crazing - brittle |
| 7 | 340 hours | Surface Crazing - very brittle |
| 8 | 340 hours | Surface Crazing - very brittle |

UV Exposure of Injection molded plagues

QUV-313 testing was performed on injection molded plaques. Initial 600° gloss readings were taken, and measured after 330 hours. Plaques containing as the black pigment only sulfur black show hazing, whereas a combination of carbon black and sulfur black stabilized according to the above examples shows excellent surface appearance.

Example 2

The following polypropylene homopolymers were formed by dry blending and subsequently melt extruded using a 30 mm twin screw extruder at approximately 240° C. Melt compounded pelletized resin was injection molded to form 65 mil plaques. Four sample plaques for each composition were made. The sample plaques were placed in a circulating air oven and suspended from horizontal rods by Teflon® clips. The sample plaques were spaced approximately 1 inch apart. The circulating air oven was maintained at a temperature of approximately 150° C. and the time to failure, in days, was measured. The term "failure," as used in this example, is the time necessary for the sample plaque to exhibit visible indication of decomposition and/or embrittlement and or loss of physical properties.

| SAMPLE | % LOAD | 1010 | O3 | STDP | CaST | N 30 | FA 1 | NaST | ZnST | Htalcite | FAILURE (days) | Average Failure (days) |
|---|---|---|---|---|---|---|---|---|---|---|---|---|
| 1 | 2.5 | 0.10% | | 0.60% | 0.10% | | | | | | 1–30, 3–35 | 34 |
| 2 | 2.5 | 0.10% | | 0.60% | | | | 0.10% | | | 4–35 | 35 |
| 3 | 2.5 | 0.10% | | 0.60% | | | | | | 0.10% | 3–31, 1–35 | 32 |
| 4 | 2.5 | 0.10% | | 0.60% | | | 0.10% | | | | 1–32, 3–35 | 34 |
| 5 | 2.5 | 0.10% | | 0.60% | | | | | 0.10% | | 1–31, 1–37, 2–38 | 36 |
| 6 | 2.5 | 0.10% | | | 0.10% | | | | | | 1–18, 3–23 | 22 |
| 7 | 2.5 | 0.10% | | 0.60% | 0.10% | 0.10% | | | | | 2–46, 2–49 | 47.5 |
| 8 | 1 | 0.10% | | 0.30% | 0.10% | | | | | | 3–30, 1–31 | 30 |
| 9 | 1 | 0.30% | | 0.60% | 0.10% | | | | | | 1–39, 3–42 | 41 |
| 10 | 1 | 0.10% | | | 0.10% | | | | | | 1–17, 3–18 | 18 |
| 11 | 1 | 0.30% | | | 0.10% | | | | | | 4–22 | 22 |
| 12 | 1 | 0.10% | | 0.80% | 0.10% | | | | | | 1–42, 3–45 | 44.3 |
| 13 | 1 | 0.10% | | 0.60% | 0.10% | | | | | | 3–38, 1–39 | 38 |
| 14 | 1 | 0.10% | | 0.60% | 0.10% | 0.10% | | | | | 3–50, 1–52 | 50.5 |
| 15 | 0.5 | 0.10% | | 0.60% | 0.10% | | | | | | 1–37, 2–38, 1–39 | 38 |
| 16 | 0.5 | 0.10% | | 0.30% | 0.10% | | | | | | 3–31, 1–32 | 31 |
| 17 | 0.5 | 0.30% | | 0.60% | 0.10% | | | | | | 1–42, 3–45 | |
| 18 | 0.5 | 0.10% | | | 0.10% | | | | | | 3–23, 1–28 | 24 |
| 19 | 0.5 | 0.10% | | 0.60% | 0.10% | 0.10% | | | | | 1–50, 3–52 | 52 |
| 20 | 2.5 | | 0.10% | 0.60% | 0.10% | | | | | | 1–38, 2–42, 1–46 | 42 |

-continued

| SAMPLE | % LOAD | 1010 | O3 | STDP | CaST | N 30 | FA 1 | NaST | ZnST | Htalcite | FAILURE (days) | Average Failure (days) |
|---|---|---|---|---|---|---|---|---|---|---|---|---|
| 21 | 2.5 | | 0.05% | 0.60% | 0.10% | | | | | | 1–30, 2–35, 1–38 | 35 |
| 22 | 1 | | 0.10% | 0.60% | 0.10% | | | | | | 2–38, 2–39 | 38.5 |
| 23 | 1 | | 0.05% | 0.60% | 0.10% | | | | | | 3–39, 1–42 | 40 |
| 24 | 1 | | 0.10% | | 0.10% | | | | | | 3–17, 1–18 | 17 |
| 25 | 2.5 | 0.10% | | | 0.60% | 0.10% | | | | | 3–30, 1–31 | 30 |
| 26 | 2.5 | 0.10% | | | 0.60% | 0.10% | | | | | 2–30, 1–38, 1–42 | 35 |
| 27 | 2.5 | 0.10% | | | 0.60% | 0.10% | | | | | 1–30, 1–31, 2–38 | 34 |

% LOAD = weight percent of sample in polypropylene;
1010 = IRGANOX 1010;
O3 = HOSTANOX O3;
STDP = distearyl 3,3'-thiodipropionate;
CaST = Calcium stearate;
N 30 = secondary oligomeric hindered amine light stabilizer;
FA 1 = octadecanamide,N,N'-1,2-ethanediyl bis-;
NaST = Sodium stearate;
ZnSt = Zinc stearate; and
Htalcite = MgAl Hydroxycarbonate As can been seen from the above table, the polypropylene compositions including 0.10% N 30 (Samples 7, 14, and 19) exhibit a significant increase in the time before failure.

The above detailed description is of the preferred embodiments only. Changes and modifications in the specifically described embodiments can be carried out without departing from the principals of the invention. Therefore, the invention is intended to be limited only by the scope of the appended claims, as interpreted according to the principals of patent law, including the doctrine of equivalents.

I claim:

1. A heat stabilizing composition for a polyolefin, comprising: (A) an oxidized, non-cationized, non-silylated sulfur black pigment, (B) a hindered phenolic antioxidant, (C) a sulfur-containing secondary stabilizer, and (D) a hindered amine.

2. The heat stabilizing composition of claim 1, wherein (A) is selected from C. I. Sulphur Black 1; C. I. Sulphur Black 2; C. I. Sulphur Black 11; and C. 1. Sulphur Black 18.

3. The heat stabilizing composition of claim 1, wherein (A) is present in the range from 0.1 to 10 w % on total wt %., (B) is from 0.01 to 1 w % on total wt. %, (C) is from 0.02 to 2 w % on total wt %, and (D) is from 0.05–1 w % on total wt %.

4. The heat stabilizing composition of claim 1, wherein said sulfur black pigment is washed to reduce the water soluble salts present in said sulfur black pigment.

5. The heat stabilizing composition of claim 1, wherein said phenolic antioxidant is selected from 2,6-di-t-butyl-4-methylphenol;
2,6-di(α-methylbenzyl) 4-methylphenol;
4-hydroxymethyl-2,6-di-t-butylphenol;
butylated hydroxyanisole;
2,6-bis(1,1-dimethylethyl)-4-methyl phenol;
2-t-butyl-1,4-benzenediol;
octadecyl 3,5-di-t-butyl-4-hydroxybenzyl phosphonate;
ethylene 3,3-bis(3-tert-butyl-4-hyd roxyphenyl) butyrate;
2,2'-methylenebis(4-methyl-6-t-butylphenol);
2,6-di-tert-butyl-4-methylphenol;
2,6-di-tert-butyl-4-hydroxymethylphenol;
4,4'-butylidenebis[3-methyl-6-tert-butylphenol];
2,2'-butylidenebis[4-methyl-6-tert-butylphenol];
4,4'-methylenebis(2,6-di-tert-butylphenol);
2,2'-methylenebis (4-methyl-6-nonylphenol);
2,2'-methylenebis [4-methyl-6-(1-methylcyclohexyl) phenol];
2,2'-bis(4-hydroxy-3-methylphenyl) propane;
2,2'-oxalyidiamidobisethyl 3-(3,5-di-tert-butyl-4-hydroxyphenyl) propionate;
2,2'-methylenebis(4-ethyl-6-tert-butylphenol);
2,2'-methylenebis[6-(1-methylcyclocyclohexyl)-p-cresol];
4,4'-thiobis(6-t-butyl-o-cresol);
2,2'-thiobis[4,6-di-tert-butyl-m-cresol];
2,2'-thiobis[4,6-di-tert-butyl-o-cresol];
4,4'-thiobis (3-methyl-6-t-butyl phenol);
thiobisdiethylenebis(3,5-di-t-butyl-4-hydroxy) hydrocinnamate;
butyric acid, 3,3-bis(3-t-butyl-4-hydroxyphenyl) ethylene ester;
2,2'-ethylidenebis(4,6-di-t-butylphenol);
2,2'-thiobis(4-methyl-6-tert-butylphenol);
bis[4-(2-phenyl-2-propyl)phenyl] amine;
N,N-dimethyl(3,5-di-tert-butyl-4-hydroxybenzyl) amine;
4,4'-di-tert-octyidiphenylamine;
1,1-bis(2-hydroxy-3,5-dimethylpheriyl)-3,5,5-trimethylhexane; and
1,6-hexamethylene bis[3-(3,5-di-tert-butyl-4-hydroxyphenyl) propionate].
the polyphenols, like 1,3,5-tris(4-t-butyl-3-hydroxyl-2,6-dimethylbenzyl)-1,3,5-triazine-2,4,6-(1 H, 3H, 5H)-trione;
tetrakis[methylene (3,5di-t-butyl-4-hydroxy) hydrocinnamate]methane;
1,3,5-tris(3,5-di-tert-butyl-4-hydroxybenzyl)-s-triazine-2,4,6 (1H, 3H, 5H)-trione;
1,3,5-tris(2,6-dimethyl-3-hydroxy-4-tert-butylbenzyl) isocyanurate;
trimethyl-2,4,6-tris(3,5,-di-t-butyl-4-hydroxybenzyl) benzene);
tris(3,5,-di-t-butyl-4-hydroxybenzyl) isocyanurate;
tris(3,5-di-tert-butyl-4-hydroxyphenyl) phosphate;
hydrocinnamic acid, 3,5-di-t-butyl-4-hydroxy-, triester with 1,3,5-tris(2-hydroxyethyl)-s-triazine-2-4,6-(1H, 3H, 5H)-trione;

1,1,3-tris ((2-methyl-4-hydroxy-5-t-butylphenyl)butane);
3,5-bis((3,5-di-tert-butyl-4-hydroxy)benzyl)-2,4,6-trimethylphenol;
pentaerythritol tetrakis(3,5-di-tert-butyl-4-hydroxyphenyl) propionate;
calcium bis(ethyl 3,5-di-tert-butyl-4-hydroxybenzylphosphonate);
o,o-dimethyl o-(4-cyanophenyl) phosphorothioate;
terephthalic acid, 1,4-dithio-,S,S-bis(4-tert-butyl-3-hydroxy-2,6-dimethylbenztl) ester;
triethylene glycol bis(3-tert-butyl-4-hyd roxy-5-methylhydrocinnamate);
hexamethylene bis(3,5-di-tert-butyl-4-hydroxyhydrocinnamate;
1,2-bis(3,5,di-tert-butyl4-hydroxyhydrocinnamoyl) hydrazide;
4,4'-di-tert-octyldiphenamine;
phosphonic acid, (3,5-di-tert-butyl-4-hydroxybenzyl)-, dioctadecyl ester;
1,3,5-trimethyl-2,4,6-tris(3',5'-di-tert-butyl-4'hydroxybenzyl)benzene;
2,4-bis(octylthio)-6-(4-hydroxy-3,5-di-tert-butylanilino)-1,3,5-triazine;
isooctyl 3-(3,5-di-tert-butyl-4-hydroxyphenyl) propionate;
octadecyl 3-(3,5-di-tert-butyl-4-hydroxyphenyl) propionate;
3,7-bis(1,1,3,3-tetramethylbutyl)-10H-phenothiazine;
2,2'-methylenebis(4-methyl-6-tert-butylphenol) monoacrylate;
2-tert-butyl-6-[1-(3-tert-butyl-2-hydroxy-5-methylphenyl)ethyl]-4-methylphenyl acrylate;
2-[1-(2-hydroxy-3,5-di-tert-pentylphenyl)ethyl]-4,6-di-tert-pentylphenyl acrylate;
1,3-dihydro-2H-Benzimidazole;
2-methyl-4,6-bis[(octylthio)methyl]phenol;
N,N'-trimethylenebis-[3-(3,5-di-tert-butyl-4-hydroxyphenyl)propionamide;
4-n-octadecyloxy-2,6-diphenylphenol;
2,2'-ethylidenebis[4,6-di-tert-butylphenol];
N,N'-hexamethylenebis(3,5-di-tert-butyl-4-hydroxyhydrocinnamamide);
diethyl (3,5-di-tert-butyl-4-hydroxybenxyl)phosphonate;
4-octyl-N-(4-octylphenyl)-benzenamine;
4,4'-di-tert-octyidiphenylamine;
N-phenyl-1-napthalenamine;
2,2,4-trimethyl-1,2-dihydroquinoline polymer;
tris[2-tert-butyl-4-(3-ter-butyl4-hydroxy-6-methylphenylthio)-5-methyl phenyl] phosphite;
zinc dinonyidithiocarbamate; and
3,9-bis[1,1-diimethyl-2-[(3-tert-butyl-4-hydroxy-5-methylphenyl)propionyloxy]ethyl]-2,4,8,10-tetraoxaspiro[5.5]undecane.

6. The heat stabilizing composition of claim 1, wherein said sulfur-containing secondary stabilizer is selected from the group consisting of
2,2'-thiobis(4-methyl-6-tert-butylphenol);
tetrakis(3-laurylthiopropionyloxymethyl)methane;
pentaerythritol tetrakis(3-alkylthiopropionate) wherein alkyl is $C_{6-20}$ carbon atoms, e.g. pentaerythritol tetrakis (3-dodecylthiopropionate);
lauryl 3,3'-thiodipropionate;
stearyl 3,3'-thiodipropionate;
distearyl disulfide;
dilauryl 3,3'-thiodipropionate;
dimyristyl 3,3'-thiodipropionate;
propionic acid, 3,3'-thiobis-, didodecyl ester;
ditridecyl 3,3'-thiodipropionate;
distearyl 3,3'-thiodipropionate,
dioctadecyl 3,3-thiodipropionate; and dimyristyl 3,3'-thiodipropionate.

7. The heat stabilizing composition of claim 1, wherein said sulfur-containing secondary stabilizer is selected from the group consisting of
2,2'-thiobis(4-methyl-6-tert-butylphenol);
tetrakis(3-laurylthiopropionyloxymethyl)methane;
pentaerythritol tetrakis(3-alkylthiopropionate) wherein alkyl is $C_{6-20}$ carbon atoms, e.g. pentaerythritol tetrakis (3-dodecylthiopropionate);
lauryl 3,3'-thiodipropionate;
stearyl 3,3'-thiodipropionate;
distearyl disulfide;
dilauryl 3,3'-hiodipropionate;
dimyristyl 3,3'-thiodipropionate;
propionic acid, 3,3'-thiobis-, didodecyl ester;
ditridecyl 3,3'-thiodipropionate;
distearyl 3,3'-thiodipropionate, dioctadecyl 3,3-thiodipropionate; and
dimyristyl 3,3'-thiodipropionate.

8. The heat stabilizing composition of claim 1, wherein said hindered amine has the structure:

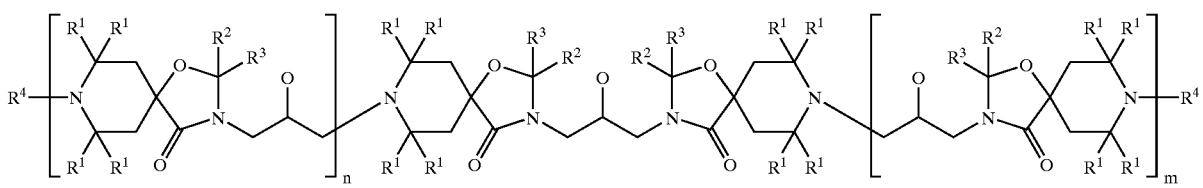

in which n and m are independently 0 to 100, with the proviso that n and m cannot both be 0,
$R^1$ is hydrogen, $C_5$–$C_7$-cycloalkyl, or a $C_1$–$C_{12}$-alkyl group,
$R^2$ and $R^3$ independently of one another are a hydrogen atom or a $C_1$–$C_{18}$-alkyl group or, together with the carbon atom connecting them, a 5- to 13-membered hindered amino group, and
$R^4$ is either hydrogen or a $C_1$–$C_5$-alkyl group, an oxygen radical O*, —OH, —NO, —CH$_2$CN, benzyl, allyl, a $C_1$–$C_{10}$-alkyloxy group, a $C_5$–$C_6$-cycloalkyloxy group, a $C_6$–$C_7$-aryloxy group in which additionally the aryl radical can also be substituted, a $C_7$–$C_{10}$-arylalkyloxy group in which additionally the aryl radical can also be substituted, a $C_3$–$C_6$-alkenyl group, a $C_3$–$C_6$-alkynyl group, a $C_1$–$C_4$-acyl group, halogen or $C_7$–$C_9$-phenylalkyl which is unsubstituted or substituted on the phenyl ring by $C_1$–$C_2$-alkyl.

9. The heat stabilizing composition of claim 1 further comprising a benzophenone compound.

10. The heat stabilizing composition of claim 1, further comprising carbon black pigment.

* * * * *